Jan. 4, 1949.  A. J. FARRAR  2,458,065
LEVEL WINDING DEVICE
Filed June 22, 1944  5 Sheets-Sheet 2

INVENTOR.
ALVIN J. FARRAR
BY
Bales, Teare, v M°Dean
ATTORNEYS

Jan. 4, 1949.  A. J. FARRAR  2,458,065
LEVEL WINDING DEVICE
Filed June 22, 1944  5 Sheets-Sheet 4
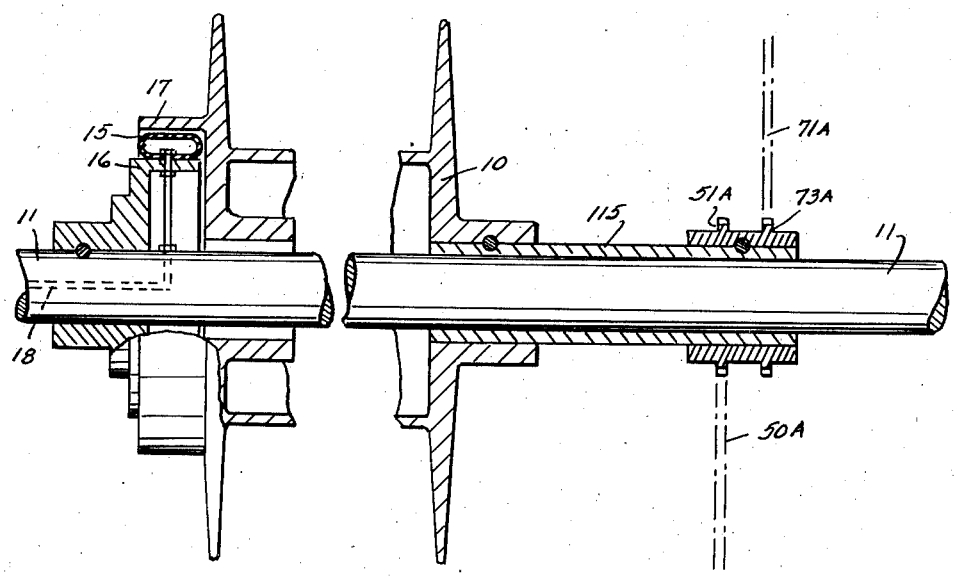
Fig. 9
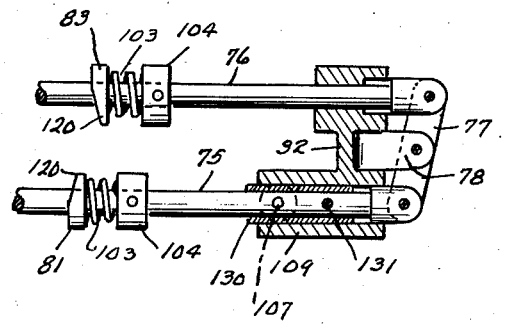
Fig. 7
Fig. 6
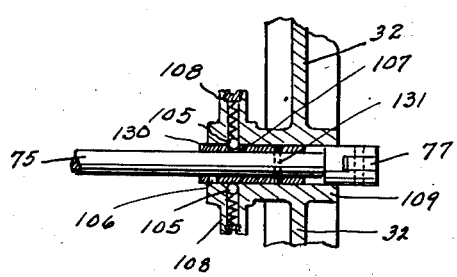
INVENTOR.
ALVIN J. FARRAR
BY
Bates, Teare & McBean
ATTORNEYS Jan. 4, 1949.  A. J. FARRAR  2,458,065
LEVEL WINDING DEVICE
Filed June 22, 1944  5 Sheets—Sheet 5

INVENTOR.
ALVIN J. FARRAR
BY
Bates, Teare & McBean
ATTORNEYS

Patented Jan. 4, 1949

2,458,065

UNITED STATES PATENT OFFICE 2,458,065

LEVEL WINDING DEVICE

Alvin J. Farrar, Cleveland, Ohio, assignor to The American Coach & Body Company, Cleveland, Ohio, a corporation of Ohio Application June 22, 1944, Serial No. 541,591

11 Claims. (Cl. 242—158)

This invention relates to cable winches and particularly to a level winding device therefor.

One of the problems in the operation of a cable winch has been the attainment of a level winding of the cable on the drums especially whenever the load pulls the cable at an angle obliquely to axis of the drum. Such conditions occur regularly in the operation of winches that are used for loading ships, and also occur in the operation of a winch that is used on public utility equipment. Under such conditions, the cable has a tendency to pile up at one end of the drum, and efforts by the operator to relieve such condition have often resulted in serious injury to the hands. A further difficulty presented by the problem is the fact that any level winding device under consideration must not only be capable of withstanding severe lateral stress, but also must be capable of manipulation so as to permit the cable to be payed out freely whenever desired, and must be capable of automatic operation regardless of the direction of rotation of the drum.

An object of the present invention is to make a level winding device that is suitable for use on cable winches, which will overcome the difficulties above enumerated and will be capable of application to existing winches, as well as to form part of original winch equipment. The invention contemplates a device which will be sturdy in construction, compact in size, and be effective in operation regardless of either the position of the cable with respect to the drum or of the direction of rotation of the drum.

Figure 1:
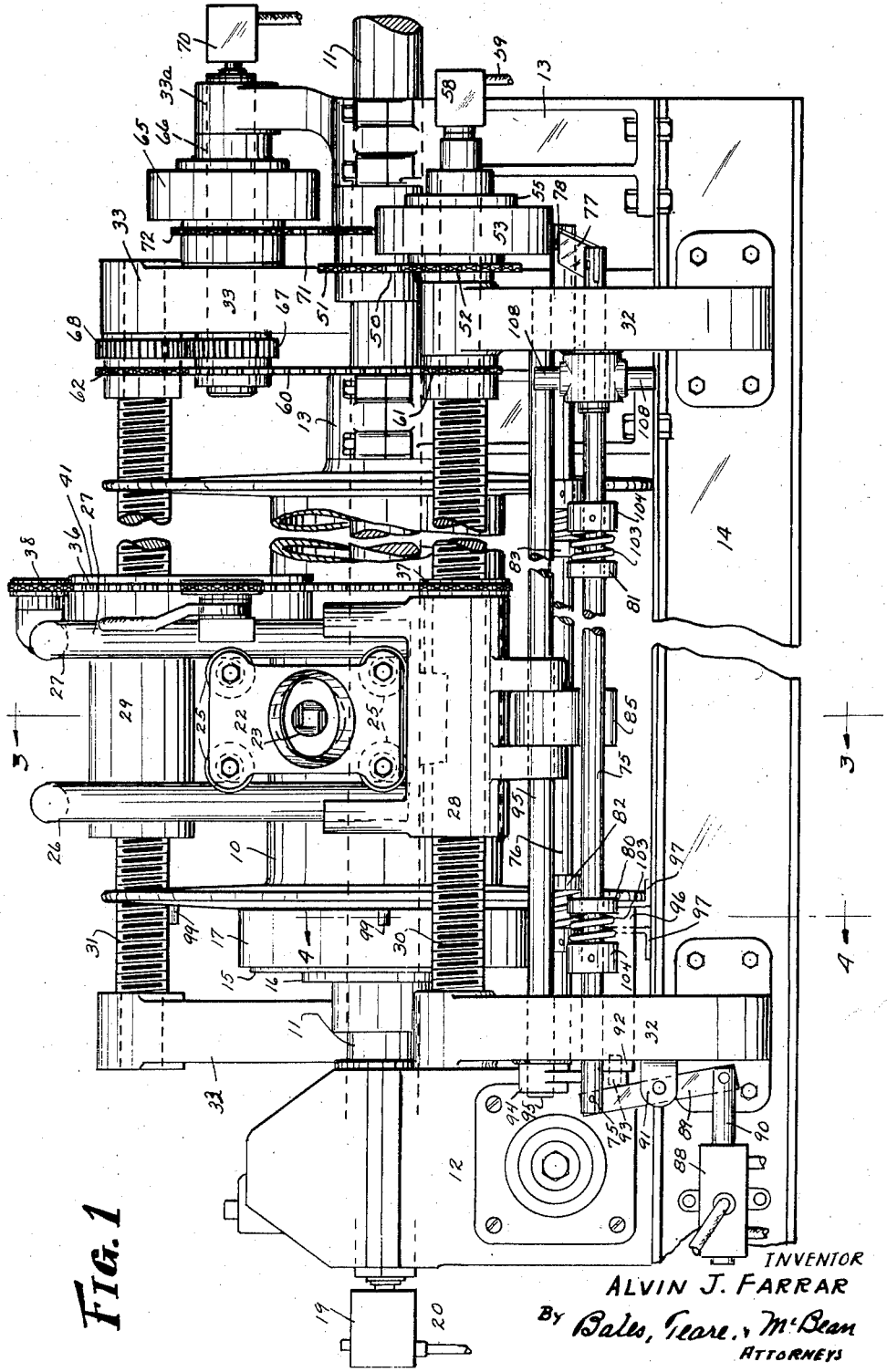
Figure 2:
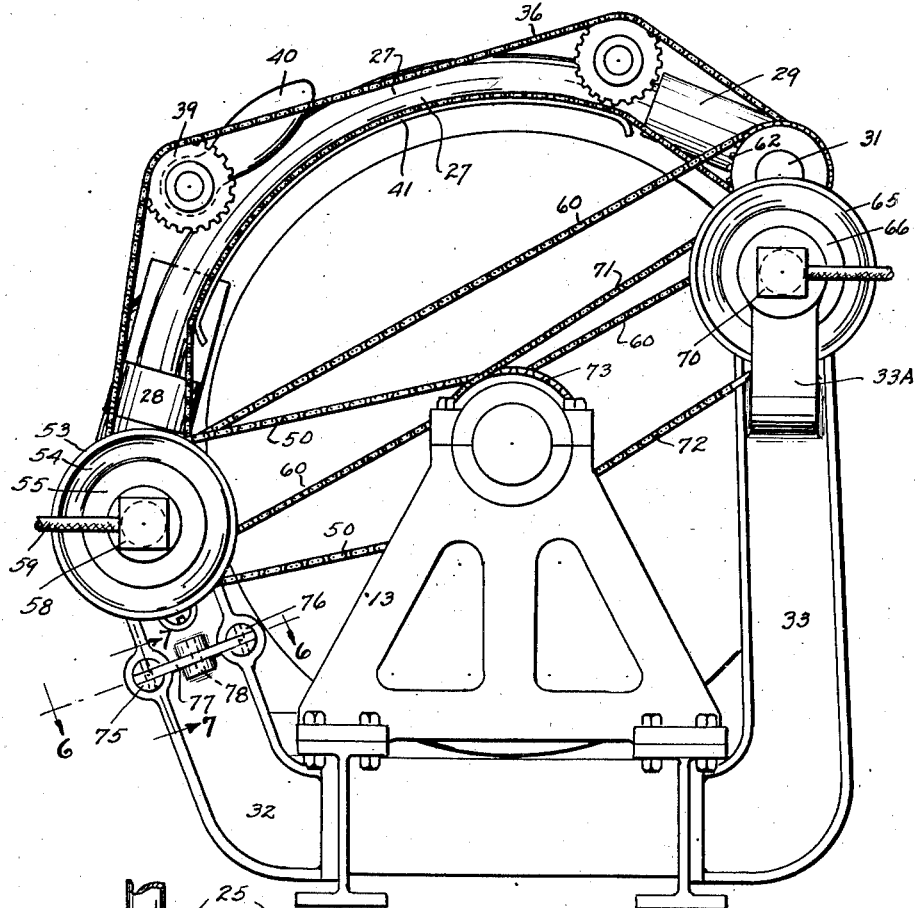
Figure 5:
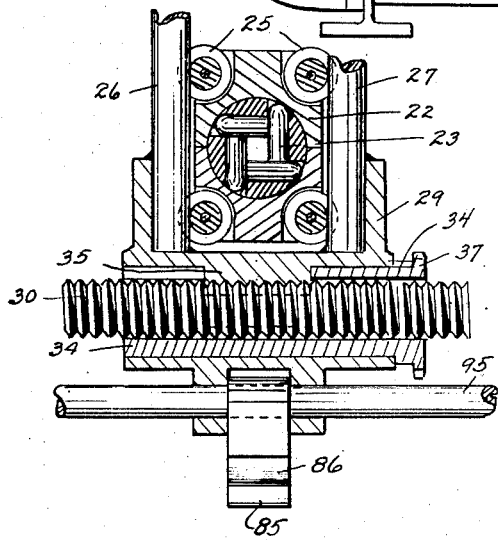
Figure 3:
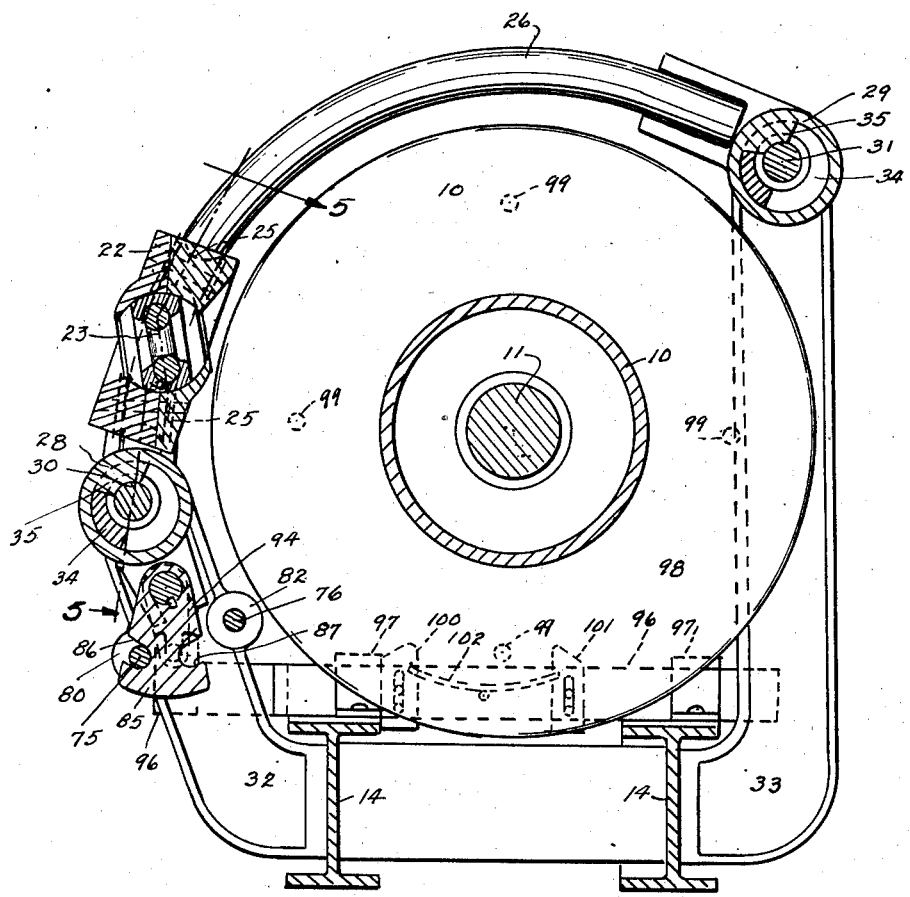
Figure 4:
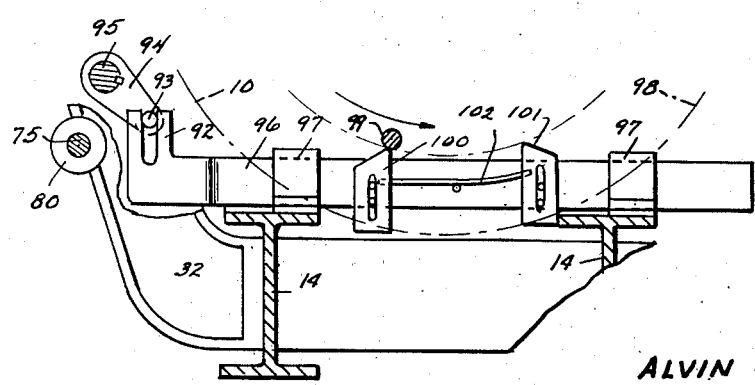
Figure 6:
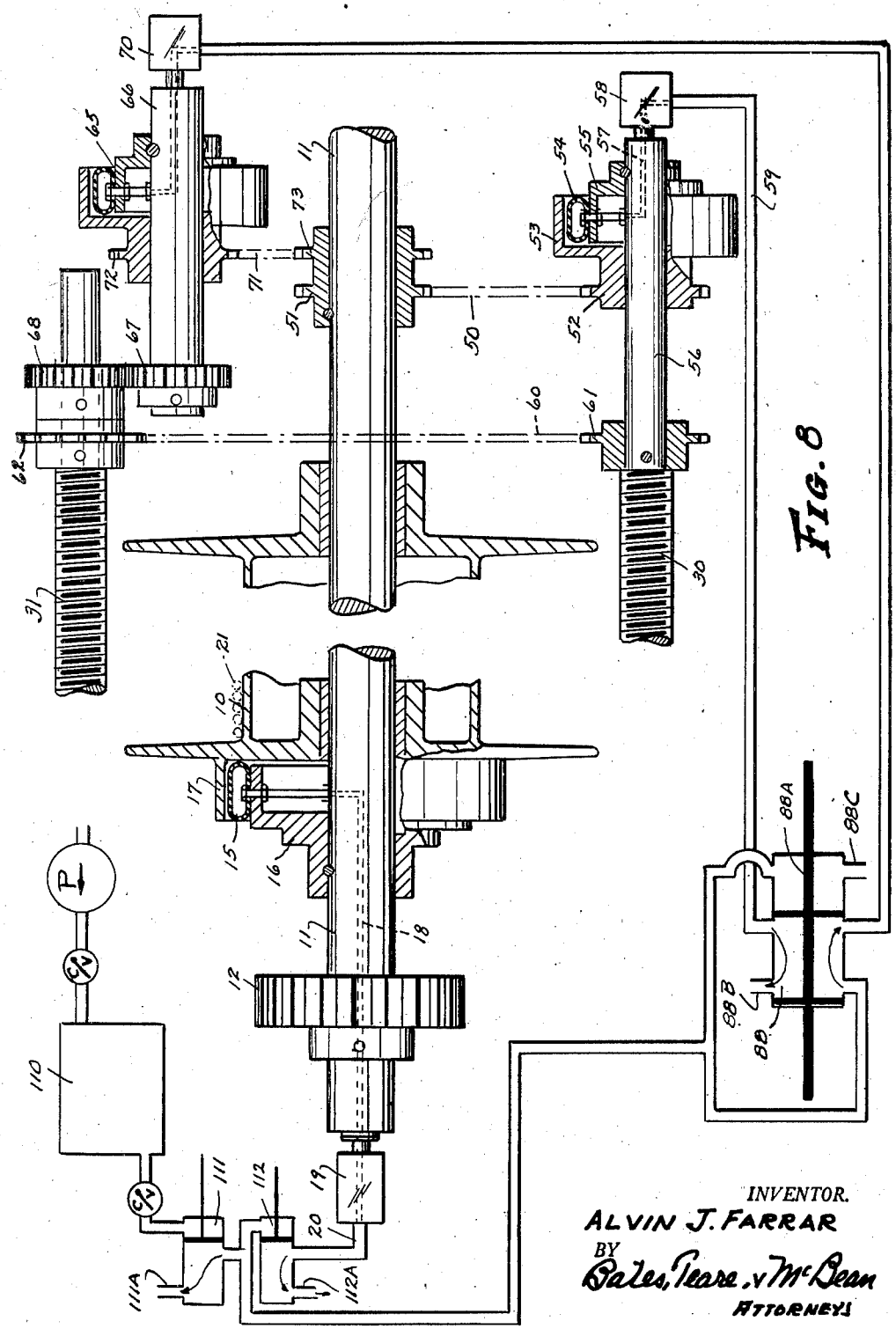

In the drawings, Fig. 1 is a front view of a cable winding winch having a level winding device embodying my invention thereon; Fig. 2 is an end view of the structure as shown in Fig. 1; Figs. 3 and 4 are sections taken on the correspondingly numbered lines in Fig. 1; Fig. 5 is a section taken on a plane indicated by the lines 5—5 in Fig. 3; Fig. 6 is a section taken on a plane indicated by the line 6—6 in Fig. 2; Fig. 7 is a section taken on the plane indicated by the line 7—7 in Fig. 2; Fig. 8 is the fluid pressure operated clutch mechanism, together with the mechanical drive mechanism and ilustrating also the fluid pressure control valve, and Fig. 9 is a diagram illustrated in sectional view to show a modification of the driving mechanism.

I have shown a winch to which my invention is applied as having a drum 10, which is loosely mounted for rotation on a drive shaft 11 that is rotated by a source of power, indicated in general as a gear box 12. The shaft may be journalled at one end in the gear box and at the other end in frame members 13 that are supported on stringers 14, which in turn are affixed to any desired supporting surface. For effecting a driving connection between the drum and shaft, I have shown a fluid pressure actuated clutch which includes an expandible member 15 that is carried by a drum 16 on the shaft and that is adapted to bear against a concentric flange 17 on one end of the drum. Fluid under pressure may be led into the expandible member through a conduit 18 which extends outwardly from the shaft 11 to a connection, indicated in general at 19, to which air under pressure may be led into the conduit from a source of fluid pressure supply through a conduit 20.

The present invention is concerned primarily with a level winding device for a cable indicated at 21 on the drum. The device includes a cable guide 22 which is shown as having a fair-lead 23 that is universally movable within the guide, as by a ball and socket connection therewith. Provision is made for movement of the guide in a direction circumferentially of the drum, and outside the confines of the end flanges thereof, and to this end is provided with flanged wheels 25 which are adapted to travel along a track provided by parallel curved bars 26 and 27, each of which has one end thereof rigidly attached to a head 28 at the front of the winch, and has the opposite end thereof rigidly attached to a head 29 at the rearward portion of the drum. The front head is supported for traversing movement along a threaded shaft 30, while the rearward head is supported for traversing movement along a threaded shaft 31 and the shafts in turn are journalled in bearings that are carried by frame members 32 and 33 respectively. These frame members may be rigidly attached to the webs of the stringers 14 and may be disposed adjacent the front and rearward portions of the drum respectively. The heads 28 and 29, and the connecting bars 26 and 27 thus provide a carriage which is adapted to traverse the drum and to support the cable guide which is free to move along the bars of the track in accordance with the direction of pull on the cable.

The carriage is intended to be propelled axially of the drum by a rotation of the shaft 30 and 31, but provision is also made for disengaging the driving connection so as to permit the cable to be payed out freely. Accordingly, I provide between the screw shafts and the carriage heads, detachable connections which may take the form of a partial nut 35 rigid with each head and an eccentric unthreaded bushing 34 in each head which slidingly supports the carriage on the associated screw shaft; the arrangement being such that whenever the bushing is turned in one direction with relation to the associated head, the nut carried by the head will engage the thread on the associated shaft, and when turned in the opposite direction the nut will disengage the thread on the shaft. Simultaneous operation of the nuts with respect to the associated shafts may be obtained by means of a chain 36 which extends around sprocket wheels 37 and 38 on the respective bushings and which is adapted to be actuated by rotation of a sprocket wheel 39 which is disposed between the aforesaid sprocket wheels and which is journalled for rotation on the guide bar 27. A lever 40 enables the wheel 39 to be manually rotated for effecting movement of the chain and thereby simultaneously rotating the eccentric bushing in each head sufficiently to disengage the threads on the screw shafts and nuts, or to bring them into engagement with each other, as desired. The lower reach of the chain is caused to follow the general contour of the rod 27 by means of a guide plate 41 that is attached thereto.

To drive the level winding shafts 30 and 31 in unison with the rotation of the drum, I provide mechanism for effecting a driving connection with the shaft 11 and in one form such mechanism includes level winding clutch means operable for simultaneous actuation with the clutch 15. Such mechanism may include a chain 50 which extends around a sprocket wheel 51 that is rigid with the shaft 11, and around a sprocket wheel 52 that is rigid with one member 53 of a pneumatic clutch. The other member of the clutch comprises an expandible member 54 which is rigidly carried by the clutch member 55, which in turn is affixed to an extension 56 of the shaft 30. Fluid under pressure may be conducted to the expandible member 54 through the conduit 57, the connection 58, and the conduit 59, from a suitable source of supply.

To rotate the shaft 31 at the same rate of speed as the shaft 30, a chain 60 interconnects them by extending around sprocket wheels 61 and 62 on the shafts 30 and 31 respectively. Thus, whenever the clutch controlled by the expandible member 54 is engaged, the shafts 30 and 31 are rotated in the same direction, and since they are threaded in the same direction, the cable guide carriage is caused to traverse the drum.

To obtain a reversal of direction of rotation of the shafts 30 and 31, I provide mechanism for disengaging the clutch controlled by the expandible member 54 and for engaging a second clutch controlled in general at 65, for operating a reversing mechanism. The reversing mechanism includes a jack shaft 66 which is directly geared to the shaft 31 by gears 67 and 68, and which is journalled in one of the frame members 33, and an extension 33a of such member. The driven member of the clutch 65 is rigid with the jack shaft, but the driving member thereof is loosely mounted on the shaft and the two members are adapted to be brought into driving engagement by means of an expandible member through an air connection 70, similar to that described in connection with the expandible member 54. The driving member of the clutch has a driving connection with the shaft 11 by means of a chain 71 which extends around a sprocket wheel 72 on the jack shaft, and a sprocket wheel 73 on the shaft 11. By virtue of the interposed gear connections 67 and 68, the shafts 30 and 31 are rotated in a direction opposite to that previously described, and such reversing movement is effected by disengaging the clutch 54 and engaging the clutch 65.

The mechanism for effecting the disengagement of the clutch 54 and engagement of the clutch 65 and vice versa, includes a pair of shipper rods 75 and 76 which are slidably mounted in the front frame members 32 and which extend across the front of the drum. The rods are interconnected at one end by a link 77 which is pivoted intermediately at 78 (Fig. 2) to a bracket 79 that projects laterally from one of the frame members 32, the arrangement being such that whenever one bar is moved axially in one direction, the other is moved correspondingly in the opposite direction.

Each shipper rod carries stops indicated at 80, 81, 82, and 83, which are adapted to be engaged by a finger 85 that depends from the carriage head 28. The finger is mounted for pivotal movement with respect to the head and extends downwardly between the shipper bars and is provided with notched openings 86 and 87 for engaging the respective shipper bars, as desired, in accordance with the direction of rotation of the drum, as will hereinafter be set forth.

Movement of the shipper rod 75 is utilized for actuating a valve 88 by means of which fluid under pressure may be directed for simultaneously effecting engagement of one of the level winding clutches, and disengagement of the other. The mechanism shown for actuating the valve may comprise a link 89, one end of which is pivotally connected to one end of the shipper rod 75 and the other end of which is pivotally connected to one valve rod 90 which projects from the end of the valve casing 88. The link in turn is pivotally mounted at a point intermediate its ends on a bracket 91 that is carried by one of the frame members 32. Thus, whenever either shipper rod is moved sufficiently in a direction extending axially thereof, the level winding clutch control valve is actuated, resulting in a reversal of rotation of the level winding screw shafts.

The axial shifting of the shipper rods is occasioned as aforesaid by engagement of the finger 85 with any one of the limit stops 80, 81, 82, or 83, depending upon the direction of rotation of the drum at any given time, and upon the direction of travel of the cable guide, the mechanism being such that the finger 85 is automatically shifted from one rod to the other in the event of reversal of the drum, while the cable carriage is disposed intermediate the ends of the drum.

The mechanism for shifting the finger 85 from one shipper rod to another may comprise a yoke 92 which is adapted to straddle a pin 93 that projects laterally from an arm 94, which in turn is shown as being rigid with a rock shaft 95 that forms the pivotal connection for the finger 85 to the head 28. The rock shaft 95 is also journalled in the frame members 32, and is shown as projecting beyond one end thereof and as having the arm 94 affixed thereto on the outer side of one of the frame members, the arrangement being such that whenever the yoke is shifted back and forth, the shaft 95 is rocked, whereupon the finger 85 is caused to swing sufficiently with respect to its associated head 28 to move out of coacting relationship with one shipper rod and to move into coacting relationship with the other shipper rod.

The position of the yoke 92 is controlled by the position of a bar 96 which carries it and which is guided for reciprocal movement in supports 97 that are mounted on the stringers adjacent the outer face of the radial flange at one end of the drum. The flange indicated at 98 carries pins 99 which project outwardly therefrom and which are disposed at equal radial distances from the axis of the drum. The purpose of the pins is to engage either a stop member 100 or 101, depending upon the direction of drum rotation, and thereby to effect a shifting of the bar 96, and consequently a shifting of the yoke 92 to effect ultimately a shifting of the finger 85, as aforesaid. The stop members are so mounted on the bar that each yields with respect to the bar to permit passage of the pins in one direction, but is unyielding with respect to the bar when engaged by the pins moving in the opposite direction.

In the preferred arrangement, the stop construction associated with the shifter bar 96 utilizes a spring 102 carried by the bar and which has the ends thereof extending into slots in the respective stop members. The stop members are spaced apart sufficiently that as the drum is rotated in one direction, the stop member which is first interposed in the path of the pin, yields to allow the pin to pass without moving the shifter bar 96, whereas the other stop member is engaged by the nearest pin, and since the member is unyielding in such direction, it causes the shipper rod to be shifted until the pin clears the stop member. Upon reversal of the drum rotation, however, the first stop member to be engaged by the pins yield, whereas the second member is engaged by the first pin and as a result the shipper rod moves in a reverse direction to the desired degree.

The necessity for reversing the drum at any point at which the cable is leaving the drum, makes it necessary to utilize two shipper rods for controlling the valve that operates the level winding clutches, because after the valve has been set by movement of a shipper rod in one direction, the reversal of the direction of movement of the cable guide would, if only one shipper rod were utilized, be ineffective to reverse the direction of rotation of the level winding shaft. By shifting the finger, however, from one shipper rod to the other automatically consequent upon reversal of direction of drum rotation, then the finger 85, upon reversal of the level winding shaft, would cause the finger to engage a limit stop that is nearer to it than that on the adjacent shipper rod which previously had been moved by the finger. Thus, if the finger 85 had moved the stop 80 toward the left in Fig. 1, resulting in a concurrent movement of the stop 82 toward the right, and if the direction of drum rotation is reversed before the finger reaches the stop 81, the finger 85 would be shifted from coaction with the shipper rod 75 to the rod 76, where it is in position to engage the stop 82, instead of the stop 80, as it again approaches the same end of the drum. Unless the finger transfer is made, the valve 88 would not be actuated upon the return movement of the cable guide.

To effect a quick simultaneous action of the level winding clutches, I utilize a mechanism which results in a snap action being imparted to the valve rod 90, and I accomplish such movement by providing a spring 103 behind each stop member 80, 81, 82, and 83, by abutting the end of each spring remote from the stop against the shoulder 104 that is rigidly fixed to the associated shipper rod. Thus, each stop member is yieldable with respect to the associated rod until the associated spring is compressed, at which time the force exerted by movement of the finger 85 thereagainst operates to shift the rod. To prevent movement of the shipper rod until the spring 103 is adequately loaded and thereby to effect the desired snap action, I have shown a yieldable restraining device in the form of a pair of spring pressed balls 105 that are adapted to engage respective notches 106 or 107 in a sleeve 130 secured to the shipper rods by a pin 131. I have shown two spring pressed balls, one on each of the opposed sides of the shipper rod and as being mounted in tubes 108 that are carried by a hub 109 which projects laterally from one of the frames 32. The loading on the springs for the balls 105 is such that movement of the shipper bar is resisted until the spring 103 is loaded sufficiently to impart the desired snap action to the valve rod 90. A shifting of such rod operates to control the flow of air under pressure to disengage one of the level winding clutches and to engage the other.

To assure proper actuation of the level winding feature whenever the cable is immediately adjacent one of the end flanges on the drum, notwithstanding the fact that the direction of rotation of the drum may be reversed within a few turns of the cable adjacent the flange, I have shown the stop members 80 to 82, inclusive, as having a cam finger engaging surface 120 thereon, and I have shown the finger 85 as having a surface for coacting with each surface 120, whereby a fine degree of control may be obtained in the critical region adjacent each end of the drum.

A diagrammatic view of a piping arrangement for operating the pneumatic clutch is illustrated in Fig. 8, wherein a pump P delivers air under pressure to a storage tank 110. A manually operated master valve for controlling all of the clutches is indicated at 111, while a valve for controlling the drum clutch is indicated at 112. Suitable piping, as shown, conducts air under pressure to the reversing valve 88 which is illustrated as having upper and lower chambers separated by a partition 88A. The piping system is provided with exhaust vents 111A, 112A, 88B, and 88C to facilitate release of the clutches.

In the modification of Fig. 9, the level winding apparatus is the same except for the fact that the drive for the screw shafts 30 and 31 is taken directly from the drum instead of from the shaft 11. For accomplishing such purpose, the drum has an extension sleeve 115 which may carry sprockets 51A and 73a which are directly connected by chains 50A and 71A to the sprocket wheels 52 and 72 in the same manner as that described in connection with the chains 51 and 73.

An advantage of the present invention is the flexibility afforded in the operation of the level winding device insofar as concerns the resistance to excessive lateral thrust and regardless of the direction of rotation of the drum. The fact that the cable guide can be manually disconnected from the level winding screw shafts without releasing the pull on the cable enables the guide to be kept directly in line with the cable, notwithstanding the tendency of the guide to shift gradually from such position as the length of cable on each turn varies from one layer to another.

The invention is further advantageous in that it may be readily adapted to existing winch equipment without extensive changes in the construction thereof, and in that it is likewise adapted for installation on original equipment without materially increasing the overall dimensions of the unit. The device eliminates all danger of accidents heretofore inherent in the operation of a drum, and by utilizing pneumatic clutches, the device enables the level winder to be reversed quickly and accurately to assure adequate level winding at all times.

I claim:

1. A level winding device for a cable receiving drum comprising a pair of screw shafts spaced circumferentially of the drum, a carriage supported on the screw shafts for traversing movement along the drum, a cable guide supported on the carriage and movable with relation thereto, means including two pneumatic clutches for operating the screw shafts in timed relationship to the drum, and mechanism actuated by traversing movement of the carriage for disengaging one of said clutches and engaging another to effect reversal of rotation of the screw shafts at a predetermined point in the traversing movement of the carriage.

2. A level winding device for a cable receiving drum, including a cable guide, means including a pair of screw shafts and a carriage spanning the space therebetween for mounting the guide for traversing movement with respect to the drum, mechanism for automatically reversing the direction of movement of the cable guide consequent either upon the change in direction of rotation of the drum, or upon the guide reaching a predetermined point in the traversing movement, said mechanism including two fluid pressure actuated clutches, and including means for engaging one clutch and simultaneously disengaging another, whereby the direction of traversing movement of the guide is effected when the guide reaches either end of the drum.

3. A level winding device for a cable receiving drum comprising a cable guide mounted for traversing and circumferential movement with respect to the drum, means for effecting traversing movement of the guide whenever the drum is operated, said means including a detachable connection for permitting the guide to run freely of the traversing means, mechanism for automatically reversing the traversing direction of the guide, said reversing means including two pneumatic clutches, and mechanism for automatically disengaging one clutch and engaging the other whenever the guide reaches a predetermined point adjacent either end of the drum.

4. A level winding device for a cable receiving drum including a cable guide mounted for traversing movement along the drum, means for effecting the traversing movement and including two clutches, one of said clutches operating to drive the guide in one direction and the other operating to drive it in the opposite direction, a pair of shiftable bars each having abutment means thereon operable to effect engagement of one of said clutches and disengagement of the other, a member carried by the guide and shiftable into coacting engagement with either of said bars, and means including a part carried by the drum for shifting said member to coact with one of said bars to the exclusion of the other dependent upon the direction of rotation of said drum.

5. A level winding device for a cable receiving drum comprising a cable guide mounted for traversing movement along the drum, means for effecting reversal of the direction of travel of the guide whenever it reaches a predetermined point adjacent each end of the drum, said means including a member movable with the guide and shiftable with respect thereto, mechanism including a part carried by the drum for shifting said member upon reversal of the direction of rotation of said drum, said means operating to cause automatic reversal of traversing movement of the guide, notwithstanding reversal of direction of rotation of the drum before the guide reaches the end thereof toward which it was advancing.

6. A level winding device for a cable receiving drum, comprising a pair of spaced level winding screw shafts, means for rotating the shafts in unison with the drum, a carriage supported on the respective shafts, a second carriage traversing the first carriage and having a cable guide mounted for universal movement therein, means for effecting driving connection between the first named carriage and the respective screw shafts, said last-named means including a pair of nut members adapted to be moved into and out of engagement with the respective screw shafts, means for simultaneously moving the members with respect to the screw shafts, said first-named means including two clutches, and means for operating one clutch to the exclusion of the other.

7. A level winding device for a cable receiving drum comprising a cable guide, means supporting the guide for traversing movement with respect to the drum, said means including mechanism for reversing the direction of traversing movement whenever the guide reaches a predetermined point adjacent each end of the drum, said mechanism including a pair of shipper rods, a finger mounted for pivotal movement with respect to the guide and disposed between the rods and having notched portions adapted to receive the respective shipper rods, the drum having a shoulder thereon, means engageable by the shoulder for swinging the finger out of coaction with one shipper rod and into coaction with the other, limit stops on the respective shipper rods adapted to be engaged by said finger, and means operable upon movement of either shipper rod to effect reversal of traversing movement of the guide.

8. A level winding device for a cable receiving drum comprising a cable guide, means supporting the guide for traversing movement along the drum, means for reversing the direction of traversing movement of the guide whenever the guide reaches a predetermined point adjacent each end of the drum, said means including a slide bar having a pair of stop members yieldably mounted thereon, and a projection mounted on the drum and adapted to engage the stop members so as to shift the bar whenever the direction of rotation of the drum is reversed.

9. A level winding device for a cable receiving drum comprising a cable guide, means for causing the guide to traverse the drum for level winding the cable thereon, said means including two pneumatic clutches, mechanism actuated by traversing movement of the guide for selectively disengaging one clutch and simultaneously engaging the other or engaging the said one clutch and simultaneously disengaging the said other to effect reversal of directional movement of the guide at a predetermined point in the traversing movement thereof, and means responsive to the direction of rotation of the drum for selecting one or the other of the clutch engagements.

10. A level winding device for a cable receiving drum, comprising a screw shaft extending parallel to the axis of the drum, a cable guide, a partial nut carried by said guide and adapted to engage the shaft, an eccentric bushing slidable on the shaft and rotatably carried by the guide, said bushing having an annularly incomplete portion extending longitudinally across the nut with clearance between them, and means for turning the bushing with respect to the guide to effect disengagement of the nut with the shaft.

11. A level winding device for a cable receiving drum comprising a pair of screw shafts, a cable guide thereon rigidly carrying a pair of partial nuts to coact respectively with the shafts, a rotatable device at each screw shaft to lift the nut free from the shaft, and mechanism connecting the two devices for simultaneous rotation.

ALVIN J. FARRAR.

REFERENCES CITED

The following references are of record in the file of this patent:

UNITED STATES PATENTS

| Number | Name | Date |
|---|---|---|
| 490,984 | Pine | Jan. 31, 1893 |
| 498,655 | Ivens | May 30, 1893 |
| 499,934 | Pine | June 20, 1893 |
| 1,038,800 | Tallon | Sept. 17, 1912 |
| 1,286,964 | Elia | Dec. 10, 1918 |
| 1,941,250 | Dale | Dec. 26, 1933 |
| 2,348,987 | Lock | May 16, 1944 |